United States Patent
Smarr et al.

(10) Patent No.: US 10,084,732 B1
(45) Date of Patent: Sep. 25, 2018

(54) RANKING TO DETERMINE RELEVANCE OF SOCIAL CONNECTIONS

(75) Inventors: Joseph Robert Smarr, Half Moon Bay, CA (US); Alexander Fabrikant, East Palo Alto, CA (US); Brett Rolston Lider, San Francisco, CA (US); Zachary Yeskel, San Francisco, CA (US); Balaji Srinivasan, Fremont, CA (US); Bin Chang, Daly City, CA (US); Andrew Ames Bunner, Belmont, CA (US)

(73) Assignee: Google LLC, Mountain View, CA (US)

( * ) Notice: Subject to any disclaimer, the term of this patent is extended or adjusted under 35 U.S.C. 154(b) by 0 days.

(21) Appl. No.: 13/585,695

(22) Filed: Aug. 14, 2012

Related U.S. Application Data

(60) Provisional application No. 61/566,566, filed on Dec. 2, 2011.

(51) Int. Cl.
  *G06F 15/16* (2006.01)
  *H04L 12/58* (2006.01)
  *H04L 29/08* (2006.01)
  *G06Q 50/00* (2012.01)

(52) U.S. Cl.
  CPC .............. *H04L 51/06* (2013.01); *H04L 51/30* (2013.01); *H04L 51/36* (2013.01); *H04L 67/22* (2013.01); *G06Q 50/01* (2013.01)

(58) Field of Classification Search
  CPC ....... H04L 12/588; H04L 51/32; H04L 41/00; H04L 12/1895; H04L 41/0604; H04L 41/0631; H04L 41/0645; H04L 41/0686; H04L 41/069; H04M 2203/655; G06Q 30/02; G06Q 10/10; G06Q 10/06; G06F 9/542; G06F 17/30365; H04W 4/206
  USPC ......................................................... 709/204
  See application file for complete search history.

(56) References Cited

U.S. PATENT DOCUMENTS

| | | | |
|---|---|---|---|
| 8,793,255 B1 * | 7/2014 | Bilinski et al. | 707/740 |
| 9,501,337 B2 * | 11/2016 | Shapiro | G06F 9/542 |
| 2003/0115122 A1 * | 6/2003 | Slater | G06Q 10/10 705/35 |
| 2003/0126136 A1 * | 7/2003 | Omoigui | G06F 17/3089 |
| 2005/0283753 A1 * | 12/2005 | Ho et al. | 717/102 |
| 2009/0265106 A1 * | 10/2009 | Bearman et al. | 701/300 |
| 2010/0049684 A1 * | 2/2010 | Adriaansen et al. | 706/46 |
| 2010/0049852 A1 * | 2/2010 | Whitnah et al. | 709/226 |
| 2010/0174813 A1 * | 7/2010 | Hildreth et al. | 709/224 |
| 2010/0231364 A1 * | 9/2010 | Laine | H04L 51/38 340/309.7 |
| 2011/0196922 A1 * | 8/2011 | Marcucci et al. | 709/204 |
| 2012/0143921 A1 * | 6/2012 | Wilson | G06Q 50/01 707/798 |
| 2012/0158843 A1 * | 6/2012 | Angani | G06Q 50/01 709/204 |

(Continued)

*Primary Examiner* — Yves Dalencourt
(74) *Attorney, Agent, or Firm* — McDermott Will & Emery LLP

(57) ABSTRACT

In one aspect, a method includes receiving an indication that a first user has interacted with a second user in a social network, calculating a social affinity score between the first user and the second user based on first user information, second user information, or relationship information between the first user and the second user and scheduling delivery of a notification to the recipient based on the social affinity score. Systems and machine-readable media are also provided.

25 Claims, 5 Drawing Sheets

(56) References Cited

U.S. PATENT DOCUMENTS

| | | | | |
|---|---|---|---|---|
| 2012/0203602 A1* | 8/2012 | Walters | ............. | G06Q 30/0241 |
| | | | | 705/14.5 |
| 2012/0251011 A1* | 10/2012 | Gao et al. | ................. | 382/224 |
| 2012/0323933 A1* | 12/2012 | He | ....................... | G06Q 10/109 |
| | | | | 707/749 |
| 2013/0046770 A1* | 2/2013 | Tseng | ........................... | 707/748 |
| 2013/0067014 A1* | 3/2013 | Lau | ...................... | G06F 9/4893 |
| | | | | 709/207 |
| 2013/0080897 A1* | 3/2013 | Han et al. | ................... | 715/723 |
| 2013/0325948 A1* | 12/2013 | Chen | ..................... | G06Q 50/01 |
| | | | | 709/204 |
| 2013/0332571 A1* | 12/2013 | Hoshing | ................ | G06Q 10/06 |
| | | | | 709/217 |

* cited by examiner

RANKING TO DETERMINE RELEVANCE OF SOCIAL CONNECTIONS

This application claims the benefit of U.S. Provisional Application No. 61/566,566 filed on Dec. 2, 2011, which is hereby incorporated by reference herein.

BACKGROUND

The subject disclosure relates to the prioritization of notifications, e.g., for indicating connections between users in a social network.

An asymmetric social network is a social network in which a first member's relationship to a second member is not necessarily the same as the second member's relationship to the first member. Since the social interaction between two members in a social network is determined based in part on the nature of the relationship between the two users, in asymmetric social networks a first member may be able to interact with a second member in ways that differ from how the second member is able to interact with the first member.

In certain social networking environments, connections between any two users can occur asymmetrically. For example, a second user can connect with (e.g., add or follow) a first user, without reciprocation by the first user. In some social networks, when a second user connects with a first, a notification is sent to the first user indicating that the first user has added him/her, for example, to one or more social networking contact lists, groups and/or circles.

SUMMARY

The disclosed subject matter relates to a machine-implemented method for receiving an indication that a first user has interacted with a second user in a social network, calculating a social affinity score between the first user and the second user based on first user information, second user information, or relationship information between the first user and the second user and scheduling delivery of a notification to the second user based on the social affinity score.

These and other aspects can include one or more of the following features. The notification can comprise an indication that the first user has added the second user to one or more social networking circles or groups. The social affinity score may be calculated based on circumstance information. The first user information can comprise a number of times that the first user has been ignored or blocked by users of the social network. The first user information can further comprise one or more of an indication as to how many posts made by the first user have been blocked or flagged by users of the social network, or an indication as to how frequently the first user notifies one or more users of the social network regarding content posted by the first user. The second user information can comprise a number of times that the second user has posted publicly available content within the social network. The second user information can comprise a frequency with which the second user logs into the social network. The relationship information can comprise an indication as to whether or not the first user has ever commented on a post made by the second user. The relationship information can comprise an indication as to whether or not the second user has ever commented on a post made by the first user. In another aspect, the relationship information can further comprise one or more of an indication as to how many users, in one or more social networking circles or groups of the second user, have commented on posts by the first user, or whether the first user and the second user share similar demographic information. In yet another aspect, the delivery of the notification to the second user can further comprise delaying delivery of the notification based on the social affinity score.

The disclosed subject matter also relates to a system for prioritizing delivery of a notification via a social network, the system comprising: one or more processors; and a machine-readable medium comprising instructions stored therein, which when executed by the processors, cause the processors to perform operations comprising: receiving an indication that a sender has added a recipient to a social networking group; retrieving, in response to the received indication, sender information, recipient information and relationship information between the sender and the recipient; calculating a social affinity score between the sender and the recipient based on the retrieved sender information, the recipient information and the relationship information; and providing for delivery of a notification to the recipient based on the social affinity score, wherein the notification comprises an indication that the sender has added the recipient to one or more social networking groups or circles.

These and other aspects can include one or more of the following features. The first user information can comprise a number of times that the first user has been ignored or blocked by users of the social network. The first user information can further comprise one or more of an indication as to how many posts made by the first have been blocked or flagged by users of the social network, or an indication as to how frequently the first user notifies one or more users of the social network regarding content posted by the first user. The second user information can comprise a number of times that the second user has posted publicly available content within the social network. The second user information can comprise a frequency with which the second user logs into the social network. The relationship information can comprise an indication as to whether or not the first user has ever commented on a post made by the second user. The relationship information can comprise an indication as to whether or not the second user has ever commented on a post made by the first user. The relationship information can further comprise one or more of an indication as to how many users, in one or more social networking circles or groups of the second user, have commented on posts by the first user, or whether the first user and the second user share similar demographic information. In another aspect, scheduling delivery of the notification to the second user can further comprise, delaying delivery of the notification based on the social affinity score. In yet another aspect, scheduling delivery of the notification to the second user can further comprise, delivering the notification together with one or more other notifications based on the social affinity score.

The disclosed subject matter also relates to a machine-readable medium comprising instructions stored thereon, which when executed by a machine, cause the machine to perform operations comprising: receiving an indication that a sender has added a recipient to a social networking group; retrieving, in response to the received indication, sender information, recipient information and relationship information between the sender and the recipient; and calculating a social affinity score between the sender and the recipient based on the retrieved sender information, the recipient information and the relationship information.

These and other aspects can include one or more of the following features. The scheduling of a delivery of a notification to the second user can be based on the social affinity score.

In certain social networking environments, the delivery of user notifications occurs in an order in which the notifications are generated, irrespective of a priority order. For users that are particularly active and/or receive a large number of notifications, the user experience can be adversely affected by the frequent delivery of low-priority notifications that can occur in advance of the delivery of high priority notifications. The subject technology addresses this issue by providing delivery of notifications, for example, regarding interactions with other users, which are based on a determined social affinity with respect to the other users.

It is understood that other configurations of the subject technology will become readily apparent from the following detailed description, wherein various configurations of the subject technology are shown and described by way of illustration. As will be realized, the subject technology is capable of other and different configurations and its several details are capable of modification in various other respects, all without departing from the scope of the subject technology. Accordingly, the drawings and detailed description are to be regarded as illustrative and not restrictive in nature.

BRIEF DESCRIPTION OF THE DRAWINGS

Certain features of the subject technology are set forth in the appended claims. However, for the purpose of explanation, several embodiments of the subject technology are set forth in the following figures.

DETAILED DESCRIPTION

Figure 1:
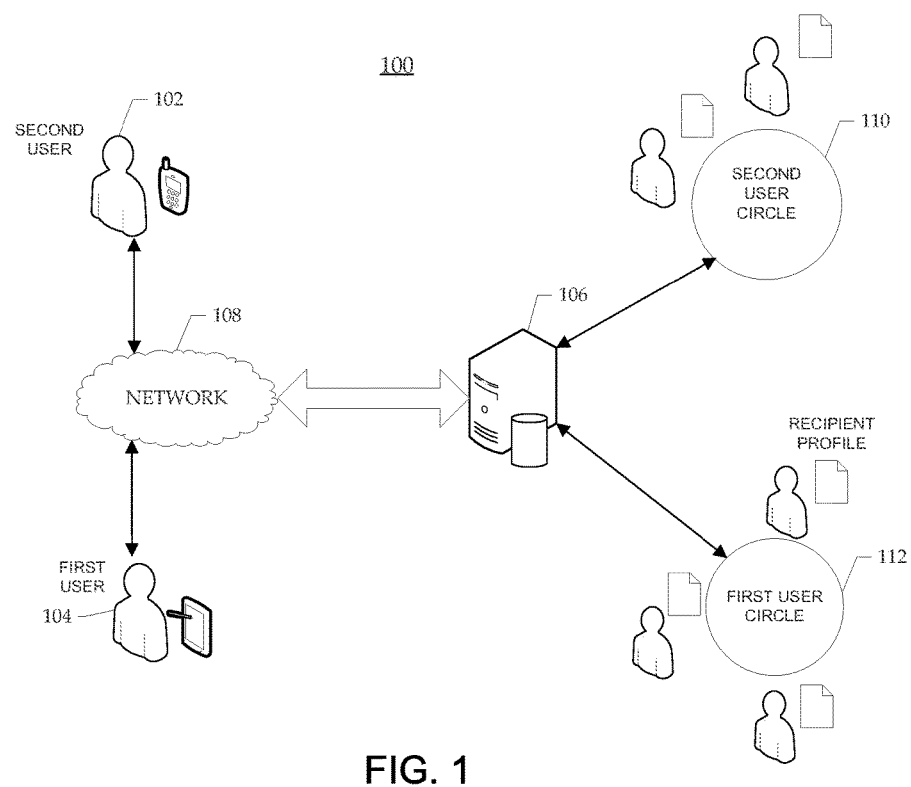
FIG. 1 illustrates an example of an asymmetric social network for facilitating interaction between two or more social network users.

The detailed description set forth below is intended as a description of various configurations of the subject technology and is not intended to represent the only configurations in which the subject technology can be practiced. The appended drawings are incorporated herein and constitute a part of the detailed description. The detailed description includes specific details for the purpose of providing a more thorough understanding of the subject technology. However, it will be clear and apparent that the subject technology is not limited to the specific details set forth herein and may be practiced without these specific details.

The phrase "social network" as used herein includes, but is not limited to, any online service, platform, network or site that facilitates the building and reflecting of social associations among users. Users of social networking sites can create associations with one another. These associations can be stored within a social graph at each social networking site. Such user associations can be defined on a user-to-user basis, or as a group of users associated through membership within a group. As used herein, the terms "contact" and "user associate" refer to other users that a user is associated with, at one or more social networking sites.

A user can organize his/her online associations into one or more "social groups" (e.g., social circles) that include one or more contacts. The social groups can be used to control distribution of messages and content. For example, "circles" can function as categories to which a user can assign their social networking contacts to better control the distribution and visibility of messages and multimedia content (e.g., documents, and other collaboration objects) that the use broadcasts via the social network. In accordance with the subject disclosure, a social circle is provided as a data set defining a collection of contacts that are associated with one another. As used herein, a social circle can be described from the perspective of an individual that is the center of a particular collection of socially interconnected people, or from the aggregate perspective of a collection of socially interconnected people. Depending on implementation, a social circle can also have narrowly defined boundaries; for example, all of the members of the social circle can be familiar with one another, and permission may be required for a member to join a particular social circle. In accordance with the subject disclosure, a user of an electronic device may define a social circle as a data set defining a collection of contacts. In some examples, the social circles may be representative of the real-life social circle of the user.

In some social networking environments, users asymmetrically add contacts to one or more social circles to connect with other users. For example, a second user could decide to follow a first user by adding the first user to one or more social networking circles or groups. Upon adding the first user to a circle or group, a notification is sent to the first user indicating that the second user has added him/her to one or more circles. In some instances, the first user and the second user could have a relatively high social affinity, e.g., a social affinity beyond a threshold value. For example, the first user and second user could be friends, colleagues and/or acquaintances that would be interested in establishing a connection and exchanging communications over the social network. In such cases, the first user may be more likely to be interested in a notification indicating that the second user has added him/her to a social circle or group.

Alternatively, if the first user and the second user have a relatively low social affinity, e.g., a social affinity beyond a threshold level, (e.g., if the first user and second user have no personal relationship and/or shared interests or friends), then there may be asymmetry in the first user's interest in the second user as compared with the second user's interest in the first user. In such a case, a notification sent to the first user indicating that the second user has added him/her to a social group or circle (or is otherwise following the first user) may be less likely to be of value to the first user.

Depending on the relation, asymmetry in the interest levels of any two users (in one another) may differ for a multitude of reasons. In some examples the first user could be a celebrity, famous person and/or an individual with high public visibility. As such, many users of the social network could be interested in connecting with the first user whereas the first user may have little interest in the majority of those users. In a social networking environment wherein the first user is instantly notified every time any user adds him/her to a particular group or circle, the notifications will primarily consist of notifications that are of little interest to the first user. In turn, the constant receipt of low value notifications and may degrade the user experience for the first user.

The subject technology provides a method and system for determining a relative social affinity between users for use in improving notification delivery. Specifically, the subject technology provides a method by which a social affinity between a first user ("recipient") and a second user ("sender") can be determined based on information related to the recipient and the sender for use in providing convenient notifications delivery to the recipient.

In some implementations, the social affinity between a recipient and a sender will be calculated as "a social affinity score." As used herein, a social affinity score is the result of a measurement of social affinity between two or more users (e.g., a recipient and a sender). It should be understood that other types of information can be used to determine a social affinity score. For example, the social affinity score may be based on one or more of the following: information pertaining to the first user or recipient (i.e., "recipient information"), information pertaining to the second user or sender (i.e., "sender information") and/or information pertaining to the relationship between the recipient and the sender (i.e., "relationship information between the sender and the recipient"). Furthermore, the calculation of the social affinity score may be based on other information items; for example, the social affinity score can also be based on circumstance information related to the circumstances of the how the sender added the recipient as a social networking contact (e.g., by following the recipient or adding him/her to one or more groups or circles, etc.).

Recipient information can comprise nearly any information pertaining to the recipient (i.e., the first user). For example, recipient information may include a frequency with which the recipient has created public posts within the social network, what fraction of the recipients posts are non-public (e.g., subject to an access control list) and/or how often the recipient visits (e.g., logs into) the social network, etc. Recipient information may further comprise an indication as to how many users are already following the recipient, how frequently the recipient has blocked and/or ignored another user in the past and/or the proportion of total notifications delivered to the recipient (e.g., from one or more senders) that have resulted in the recipient also adding the sender.

Sender information can also comprise any information pertaining to the sender. For example, sender information may comprise, but is not limited to, an indication as to how many times the sender has been ignored and/or blocked in the past, how many times notifications indicating circle or group add events by the sender have been reciprocated by the recipient and/or how many users have connected with the sender before being contacted by the sender, etc.

Sender information may also comprise information related to posts made by the sender. For example, sender information may comprise an indication as to how many of the sender's social media posts have been blocked and/or flagged by users of the social network, how many of the sender's posts have received feedback from other users and/or how frequently the sender unnecessarily notifies other users of his/her posts. In some implementations, sender information can be based on an analysis of the information content contained within one or more posts by the sender. By way of example, if a particular sender posts information content that is determined to be undesirable content, e.g., spam or unwanted advertising, this determination may be reflected in the sender information for that particular sender.

In some aspects, sender information can comprise, how long the sender has had a social media account and/or a number of times the sender's posts, comments and/or profile items have been flagged, etc. In some implementations, sender information may also include information pertaining to whether the sender has used certain features within the social networking platform, an indication as to the proportion of notifications generated by the sender that comprise an indication that the sender has added one or more recipients and/or what types of notifications have been generated by the sender, etc.

Relationship information pertaining to the relationship between the sender and the receiver can also comprise any type of information, including but not limited to, whether or not the sender and recipient have interaction history (e.g., whether they have ever shared and/or commented on each others posts), whether the sender has the recipient in his/her address book, whether the sender and recipient speak the same language and/or whether the sender and recipient live in the same geographic region (e.g., the same neighborhood or neighboring countries, etc.). In some aspects, information pertaining to the relationship between the sender and the recipient can also comprise an indication as to whether the recipient has connected with any user that is also connected to the sender; for example, whether the recipient has added one or more users to a circle or group that have also been added to a circle or group by the sender and/or whether the recipient and sender share profile information (e.g., school, work, places lived etc.).

As mentioned above, the calculation of the social affinity score can be further based on information related to contextual information, e.g., the circumstances of the sender's inclusion of the recipient in one or more social networking groups or circles (i.e., "circumstance information"). By way of example, circumstance information can comprise, but is not necessarily limited to, whether or not the sender added the recipient from the profile page of a famous user, how many other group/circle adds the sender has recently performed and/or whether the sender added the recipient from search results, etc.

It is understood that the social affinity score can be calculated based on any information pertaining to the sender and/or the user, or information that is related to other users of the social network. By way of example, the calculation of the social affinity score can be further based on whether the sender added other users that are known by the recipient and whether the other users accepted/reciprocated with the sender (e.g., whether the other uses also added the sender to one or more of their own groups or circles). The social affinity may also be based on whether the sender is connected to other users that are known to have initiated unwanted connections with other users.

After the sender adds the recipient to one or more of his/her groups or circles, a notification may be delivered to the recipient indicating that he/she was added by the sender. Delivery of the notification may be based on the social affinity score that is calculated between the sender and the recipient. For example, if it is determined that a social affinity exists between the sender and the recipient (e.g., the social affinity score exceeds a threshold), the notification may be instantly delivered. However, if it is determined that a weak social affinity exists between the user and the recipient (e.g., the sender is unknown to the recipient and/or is likely sending spam requests over the social network) the notification may be delayed, blocked. In certain aspects, wherein a weak social affinity exists between users (e.g., a first user and a second user), the notification that the first user has added the second user may be presented to the second user in a manner that visually minimizes the notification.

It is understood that models used to calculate the social affinity score can be updated based on user behavior and/or can be updated to encompass additional types of information or an increasing amount of available information pertaining to one or more users. The prediction model used to calculate the affinity score between a user and a sender can be updated based on feedback from one or more users. In some implementations, the user feedback can be used to adapt/update the prediction model using machine-learning techniques.

User feedback can comprise essentially any type of information pertaining user interaction within the social network. In some aspects, user feedback could be based on whether or not a user (e.g., recipient) typically reciprocates when he/she is added by other users (e.g., a sender). For example, a recipient user may habitually add every user that adds him/her to one or more of their social circles or groups. For such a recipient, the fact that the recipient added a particular sender to one or more of his/her circles may be of little value. However, for a recipient that is typically very selective about who he/she interacts with via the social network, the fact that the recipient added a particular sender could indicate that the sender is trustworthy and/or of a high quality (e.g., a user likely to engage others through meaningful interaction, not likely a spammer, etc.). This information could be used, for example, to help determine if and when notifications should be delivered to other recipient users who are followed by the same sender.

Information pertaining to how one or more users use their social networking account could also provide feedback used to help determine a social affinity score. In some aspects, information pertaining to how long it typically takes a recipient user to add a sender (after receiving a notification that they are being followed by the sender), could be used to determine the social affinity between the recipient and the sender, as well as between the recipient and other users (and the sender and other users). For example, if a recipient could typically take several days (from the time a notification is received), to add a sender to his/her circles or groups. Thus, the fact that a recipient waited two days before adding a particular sender may mean little about the "value" of the sender. Conversely, if a recipient typically reciprocates with users within a matter of hours, the fact that the recipient waited several days to add a particular sender could indicate that the recipient does not know the sender and/or that the sender is of low value. Thus, feedback information related to the typical duration that passes before a particular recipient will add a particular sender to his/her circles or groups, may be used to determine a future social affinity score as between that particular recipient and another user and/or that particular sender and another user, etc.

The calculated social affinity score can be used to determine how to deliver notifications to the recipient. Although, the social affinity score can be used to control the delivery of notifications comprising any information content, in some examples, the social affinity score will be used to control the delivery of notifications indicating that a sender has added the recipient to one or more social circles or groups (e.g., that the sender if following the recipient).

Depending on the calculated social affinity score between a recipient and a sender, a notification could be instantly delivered to the recipient. For example, if the affinity score is relatively high (e.g., due to the fact that recipient and sender share common social networking contacts, etc.) then the notification to the recipient (i.e., that the sender has added him/her to a group or circle) may be instantly delivered.

However, a low relative social affinity score may cause a delay in notification delivery and/or bundled delivery, such as, delivery with other notifications in the form of a list or digest, etc. For example, if a sender is adding other users with a high velocity and a low percentage of those users were reciprocating, it may indicate that the sender is unlikely to know the users he/she is attempting to connect with. Subsequently, when the sender tries to add other recipients, the calculated social affinity score could be determined to be relatively low (e.g., because the likelihood that the sender knows the recipient is low). As a result, the notification indicating that the sender added the recipient to one or more if his/her social networking groups or circles could be delayed. In some implementations, the notification may be batched for delivery with other notifications, for example, in the form of a list or digest. Alternatively, in some implementations the notification could be altogether blocked.

FIG. 1 conceptually illustrates an example of an asymmetric social network 100 for facilitating interaction between two or more social network users. The network 100 comprises a recipient 102, a sender 104, a social network server 106 and a network 108. The recipient 102, the sender 104 and the social network server 106 are all communicatively coupled to the network 108. It is understood that the social network platform could include one or more additional servers and/or networks not illustrated in FIG. 1.

In the illustrated example, the recipient 102 is a member of a social network platform, supported by the social networking server 106. The recipient's social network comprises other social networking users in recipients circle 110 as illustrated, the recipient 102 has two users in his/her social circle. The sender 104 is also a user of the social network platform supported by the social network server 106. The sender 104 has three users in his/her social circle/group (i.e., sender circle 112, including the recipient 102. Depending the privacy preference of the recipient 102, the sender 104 may be able to view (all or a portion of), the recipient's profile. By way of example, by adding/following the recipient 102, the sender 104 may receive status updates, posts etc., created by the recipient 102. In some examples, the sender 104 may only be able to access view that content which the recipient 102 has chosen to make publicly accessible. Conversely, the recipient 102 has not added the sender 104 to the recipient circle 110. As such, the recipient 102 does not receive content from the sender's profile.

In some aspects, when the sender 104 initially adds the recipient 102 to one or more of his/her social circles or groups, a notification will be sent to the recipient 102, indicating that the sender 104 has added the recipient. Users of great popularity may be routinely added to circles or groups of senders they do not personally know, and are not interested in following. Thus, the majority of notifications indicating that a sender has added the recipient may be of little interest to the recipient.

In accordance with some implementations of the subject disclosure, a social affinity score is determined as between each recipient (e.g., the recipient 102 of FIG. 4) and each sender (e.g., the sender 104), for user in measuring the recipient's interest in receiving the notification. As will be discussed in further detail below, the social affinity score may be used to determine a notification delivery mode that is most convenient for the recipient. For example, the social affinity score may be used to facilitate the instant delivery of high interest value notifications (e.g., notifications that are predicted to originate from senders of interest to the recipient). Alternatively, the social affinity score may be used to determine that a particular notification is of low interest value and that delivery of the notification should be delayed and/or combined with the delivery other notifications at a later time.

Figure 2:
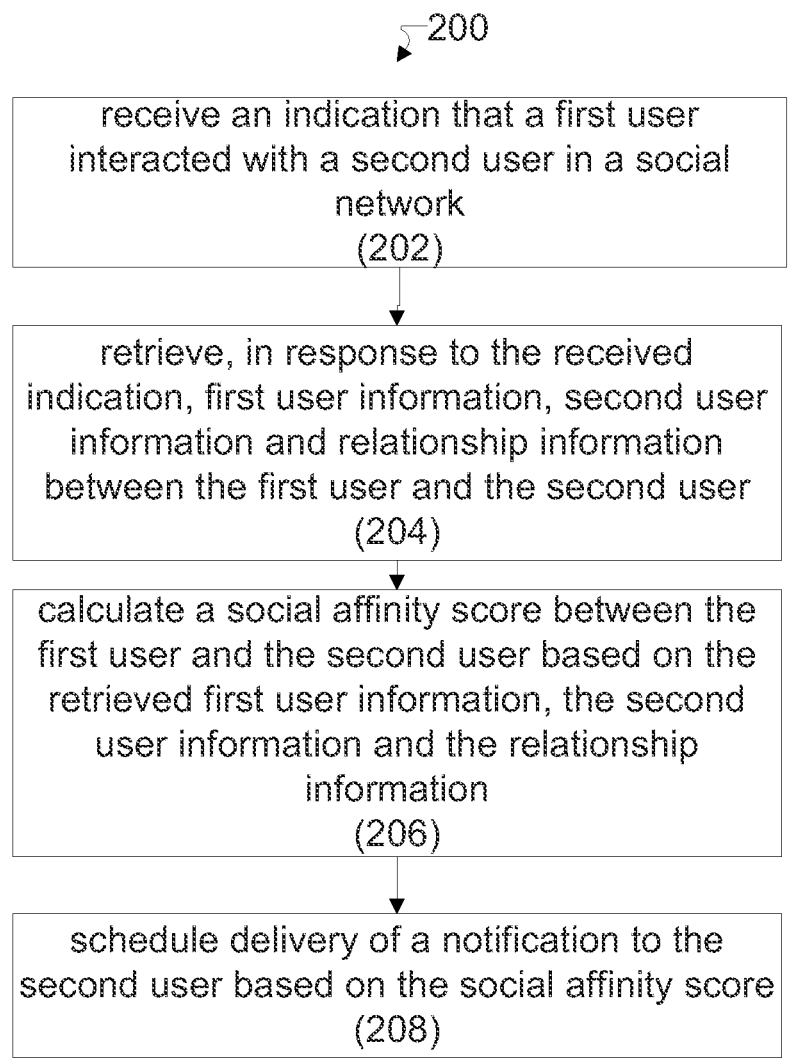
FIG. 2 illustrates a flow diagram of an example method for implementing some aspects of the subject technology.

FIG. 2 illustrates a flow diagram of an example method 200 for implementing some aspects of the subject technology. The method 200 begins with step 202 in which an indication that a sender has added a recipient to a social networking group is received. The action of the sender adding the recipient to a social networking group (or circle) could comprise any action indicating the sender's desire follow and/or connect with the recipient in order to view at least a portion of his/her profile information. For example, the sender could add the recipient to one or more lists, groups or circles and/or could request that the recipient share contact/profile information via the social network, etc.

In step 204, sender information, recipient information and relationship information between the sender and the recipient is retrieved in response to the received indication. Although the sender information may comprise any information pertaining to the sender, in some implementations the sender information can comprise one or more of the following: an indication as to whether or not (and if so how many times) the sender has been ignored and/or blocked by other users and/or how many times the sender's posts, comments and/or profile have been flagged. Sender information may also include an indication as to how many times social networking adds from the sender have been reciprocated by recipients (compensating for the amount of time lapsed since the add event occurred and whether or not the recipients have used the social networking service since the sender added him/her).

In some aspects, sender information can also comprise an indication as to how many other users (e.g., recipients) have added the sender to one or more of their social networking groups, circles and/or contact lists in the past and/or how many of the sender's social networking posts have received feedback from other users. In some instances, feedback could include an acknowledgement or indication of approval of the sender's post and/or a reply to posted content. Additionally, sender information may comprise an indication as to how long the sender has had the social networking account and/or accounts for other services within the same (or different) proprietary network(s). By way of example, sender information could comprise information about what other types of accounts are owned by the sender and/or how long the sender has held the accounts (e.g., email service accounts, other social networking accounts, etc.).

Sender information may comprise information related to what social networking services or features are routinely used (or have been used) by the sender. For example, sender information may include an indication as to what types of communication channels the sender uses to contact other social networking users (e.g., video chats, IP telephone calls, mobile device applications, etc.). Sender information can also comprise information related to the notifications generated by the sender's account activity. For example, sender information could comprise an indication as to what fraction of the notifications generated by the sender pertain to the addition of one or more recipients to the sender's social groups or circles and/or what other types of notifications have been generated by the sender's activity, etc.

The recipient information may comprise any type of information pertaining to the recipient. Recipient information may comprise information indicating that the recipient is a popular user, or famous person. Recipient information could be based on how often the recipient makes public posts; what fraction of the recipient's posts are access restricted (e.g., controlled by an access control list, etc.) and/or how frequently the recipient visits (e.g., logs into) the social network. In some aspects, recipient information can comprise an indication as to how many users are following the recipient, e.g., through the addition to one or more circles or groups and/or how many of those users the recipient also added since the last login and/or social networking event by the recipient. Furthermore, recipient information may include an indication as to how frequently the recipient has blocked and/or ignored a post or sender in the past and/or how many of the recipients prior circle or groups adds have been reciprocated.

The relationship information can include any information pertaining to the relationship between the sender and the recipient. For example, the relationship information may comprise, but is not limited to: whether or not the sender and recipient have ever commented or shared posts of the other and/or whether the sender and recipient have ever shared or commented on the same post (e.g., posts of another user). Relationship information can also include information items that would strongly indicate that the recipient and sender could be personal acquaintances; for example, whether or not the sender and recipient have contact information of the other (e.g., in an address book, etc.) and/or whether the sender and recipient have mutually shared social networking contacts (e.g., similar users in their circles or groups).

In some examples, relationship information could also include demographic information, such as, whether or not the sender and recipient speak the same language, whether the sender and recipient live in the same geographic area and/or whether the sender and recipient share common backgrounds, such as, attendance at similar schools or institutions, similar work histories (e.g., companies worked for) and/or common places lived, etc.

In step 206, a social affinity score is calculated to determine the social affinity that exists between the sender and the recipient. The social affinity score will be calculated based on the retrieved sender information, the recipient information and/or the relationship information. Although the social affinity score can be calculated in essentially any manner for producing a meaningful measure of the social affinity between the sender and the recipient, in some implementations, the social affinity score will be computed using an adaptive prediction model that is evolved/updated using a machine-learning approach.

By way of example, any information about the sender, the recipient and/or the relationship between the sender and the recipient, could be used to provide feedback for a machine learning approach (e.g., layer weights of a neural network). For example, recipient feedback could be based on actions taken by the recipient when the recipient receives a notification that a sender has added him/her to one or more circles or groups. Some recipient users may have a tendency to add/follow every user that decides to follow the recipient; thus, a decision by the recipient to add/follow a particular sender may have little bearing on whether a social affinity exists between the recipient and that particular sender. Conversely, a recipient that chooses not to add a large proportion of the senders that follow him/her may be a more discerning users; thus, a decision by the recipient to reciprocate in following a particular sender could be more meaningful.

In step 208, the delivery of a notification to the recipient will be provided for, based on the calculated social affinity score in step 206. Although the notifications sent to recipients may comprise any type of information, in some implementations the notification comprises an indication that the sender has connected with the recipient within the social network (e.g., by adding the recipient to one or more of the sender's circles, groups and/or following the recipient etc.). Depending on the implementation, the social affinity score can be used to provide for delivery of one or more notifications to the recipient in different ways.

In some implementations, a threshold will be used to determine how to handle the notification; for example, if the social affinity score is above a particular threshold level, it may be instantly delivered to the recipient. However, if the social affinity score is below a certain threshold level, the notification may be delayed and/or delivered with other notifications in the form of a list or digest, in order to provide more convenient delivery to the recipient.

By way of example, a high social affinity score (signifying a social affinity between a sender and a recipient) could indicate an increased likelihood that the recipient would be interested in knowing that a particular sender is following him/her within the social network. As such, the notification (e.g., of the sender adding the recipient) may be instantly delivered to the recipient.

Alternatively, the calculated social affinity score may be relatively low, indicating a decreased likelihood that the sender and recipient have a social affinity and thus that the recipient would be interested in receiving the notification that the sender added him/her to a social networking group or circle. In some instances, delivery of the notification will be delayed for a predetermined time period and/or delivered as part of a list or digest. For example, the notification of an unwanted add event could be included at the bottom of a digest notification list comprising notices of other add events, that way the recipient receives all notifications in one convenient communication, without being intermittently interrupted with notifications from senders of whom he/she is uninterested.

In some aspects, delivery of the notification may be accompanied by a query to the recipient as to whether or not the recipient knows the sender. The sender's response could then be used to determine the social affinity score between that particular sender and one or more other recipient users. For example, the sender's response could affect the sender information used in step 206, described above.

Figure 3:
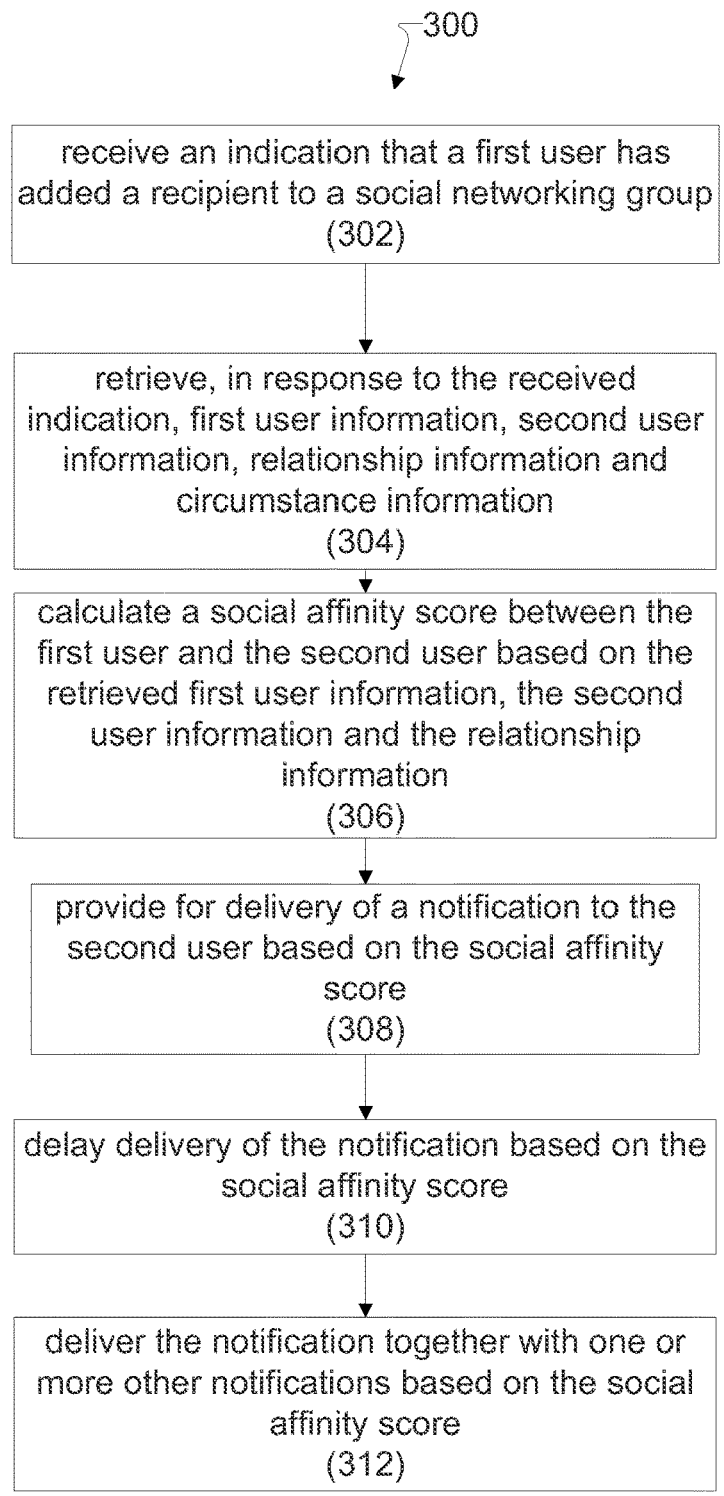
FIG. 3 illustrates a flow diagram of an example method for implementing some aspects of the subject technology.

FIG. 3 illustrates a flow diagram of an example method 300 for implementing some aspects of the subject technology. The method 300 begins with step 302 in which an indication that a sender has added a recipient to a social networking group is received. As discussed above, the action of the sender following and/or adding the recipient to a social networking group (or circle) could comprise any action indicating the sender's desire to view at least a portion the recipient's profile information.

In step 304, sender information, recipient information, relationship information (between the sender and the recipient) as well as circumstance information is retrieved in response to the received indication that the sender has added the recipient.

As discussed above, the sender information may comprise any information pertaining to the sender. For example, the sender information may comprise an indication as to whether or not the sender has added other users that are also connected with the recipient, and if so, how many of them reciprocated. Sender information may also comprise an indication as to whether or not the sender is connected to other users that have performed (or frequently perform) unwanted circle or group adds.

In some implementations, the sender information may include a measure of how much effort the sender put forth in trying to find and connect with a particular recipient. For example, sender information may be based on how long a sender spent trying to add a particular recipient and/or the velocity of sender adds (e.g., whether the sender added a large number of recipient users in a short time period), whether the sender explicitly searched for a particular recipient (for example using the recipient's name, or parts of the recipient's name) and/or whether the sender spent time viewing the recipient's profile before adding the recipient to one or more circles or groups.

Additionally, in some aspects, sender information may be based on various measures of "sender quality" for example, how engaged the sender is use of the social network. Sender information may also be based on the volume of communications exchanged between a particular sender and the users in his/her social circles/groups, whether or not the sender tends to use multiple features within the social network environment and/or whether the user's posts and/or shared content items generally precipitate feedback from other users.

Circumstance information may comprise any information related to the circumstances with which a sender added a particular recipient to one or more of his/her social networking circles or groups. In some examples circumstance information may include an indication as to whether or not the sender added the recipient from the profile page of a famous user, how many other (social networking circle/group) adds the sender recently performed, etc.

In step 306, a social affinity score is calculated to determine the social affinity that exists between a particular sender and a particular recipient. In some implementations, the social affinity score will be calculated based on the retrieved sender information, recipient information, relationship information and/or circumstance information.

As discussed above, the social affinity score can be calculated in essentially any manner for producing a meaningful measure of the social affinity between the sender and the recipient, including, but not limited to the use of a machine-learning approach. By way of example, any information about the sender, recipient, the relationship between the sender and the recipient and/or the circumstance information, could be used to provide feedback for a machine learning implementation (e.g., a neural network).

In step 308, delivery of a notification to the recipient will be provided for, based on the calculated social affinity score in step 306. As discussed above, the notifications can include any type of information; however, in some implementations the notification may comprise an indication that the sender has connected with the recipient (e.g., by adding the recipient to one or more of the sender's circles, groups and/or following the recipient etc.). Depending on the implementation, the social affinity score can be used to provide for delivery of one or more notifications to the recipient in different ways. For example, if the social affinity score indicates that there is a low social affinity between the sender and the recipient, delivery of the notification could be delayed, as will be discussed in further detail below.

As discussed above, in some implementations, a threshold may be used to determine how to handle the notification based on the social affinity score. For example, if the social affinity score is above a threshold, the notification may be immediately delivered to the recipient. Alternatively, if the social affinity score is below a given threshold, delivery of the notification could be delayed, as detailed in step 310.

In step 310, delivery of the notification is delayed based on the social affinity score calculated in step 306. In some examples, delivery of the notification will be delayed for a predetermined time period. By way of example, a recipient may be added by multiple senders of whom he/she is not interested (e.g., low social affinity score for each of the senders). Thus, the notifications indicating the add events of those senders could be batched for a predetermined time period and/or delivered at a set time. Thus, for example, the recipient may receive all notifications of which he/she has little interest at a predetermined time.

In step 312, a notification is delivered together with one or more other notifications based on the social affinity score. For example, multiple senders may add a particular recipient to one or more circles/groups etc., however, the notifications of the add events will be batched based on the calculated social affinity score (e.g., a low score). Subsequently, a sender that the recipient is interested in (e.g., a high social affinity score) may add the recipient. Thus the notification of all senders may be conveniently delivered to the recipient at the same time.

Figure 4:
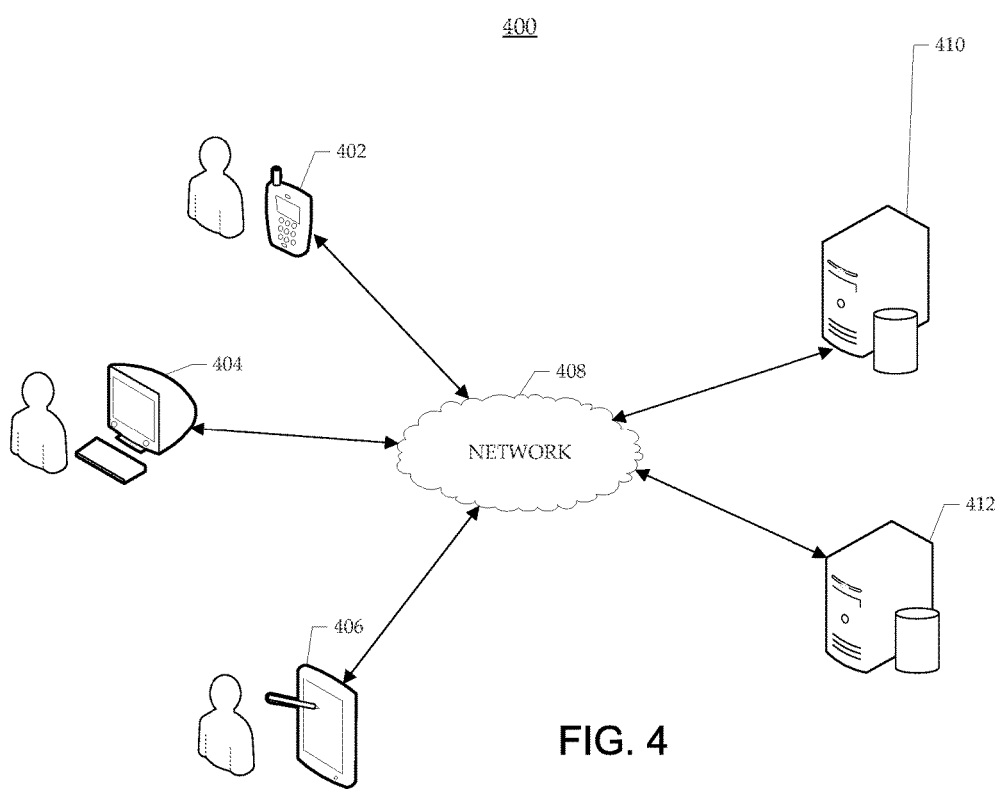
FIG. 4 illustrates an example network system that can be used for implementing some aspects of the subject technology.

FIG. 4 illustrates an example network that can be used to implementing some aspects of the subject technology. Specifically, the network system 400 comprises user devices 402, 404 and 406, a network 408, a first server 410 and a second server 412. As illustrated, user devices 402, 404 and 406 are communicatively connected to the first server 410 and the second server 412 via the network 408. It is understood that in addition to the user devices 402, 404, 406, the first server 410 and the second server 412, any number of other processor-based devices could be communicatively connected to the network 408. Furthermore, as will be discussed in greater detail below, the network 408 could comprise multiple networks, such as a network of networks, e.g., the Internet.

One or more of the process steps of the subject technology may be carried out by one or more of the user devices 402, 404, 406 and/or the first server 410 and the second server 412. For example, the first server 410 and the second server 412 can be used to support a social network platform accessible by one or more users (e.g., via user devices 402, 404 and 406). Additionally, in some aspects, the first server 410 and/or the second server 412 can be used to store and process sender information, recipient information, relationship information and/or circumstance information and/or to retrieve information used to calculate a social affinity score between one or more users of the network 408, as discussed above.

Figure 5:
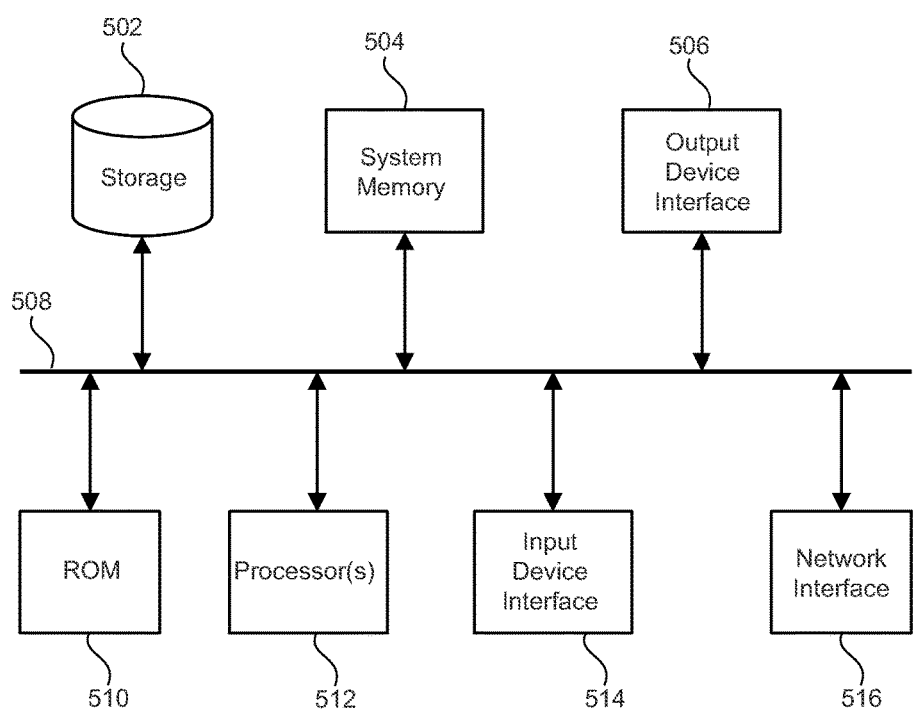
FIG. 5 illustrates an example electronic system with which some aspects of the subject technology can be implemented.

FIG. 5 illustrates an example of an electronic system that can be used for executing the steps of the subject disclosure. The electronic system 500 may be a single computing device such as a server (e.g., the first server 410 and/or the second server 412), discussed above. In some examples, the electronic system could comprise one or more user device connected to the network 408 (e.g. the user devices 402, 404 and/or 406), discussed above. Furthermore, in some implementations, the electronic system 500 can be operated alone or together with one or more other electronic systems e.g., as part of a cluster or a network of computers.

As illustrated, the processor-based system 500 comprises storage 502, a system memory 504, an output device interface 506, system bus 508, ROM 510, one or more processor(s) 512, input device interface 514 and a network interface 516. In some aspects, the system bus 508 collectively represents all system, peripheral, and chipset buses that communicatively connect the numerous internal devices of the processor-based system 500. For instance, system bus 508 communicatively connects the processor(s) 512 with the ROM 510, the system memory 504, the output device interface 506 and the permanent storage device 502.

In some implementations, the various memory units, the processor(s) 512 retrieve instructions to execute (and data to process) in order to execute the steps of the subject invention. The processor(s) 512 can be a single processor or a multi-core processor in different implementations. Additionally, the processor(s) can comprise one or more graphics processing units (GPUs) and/or one or more decoders, depending on implementation.

The ROM 510 stores static data and instructions that are needed by the processor(s) 512 and other modules of the processor-based system 500. Similarly, the processor(s) 512 can comprise one or more memory locations such as a CPU cache or processor in memory (PIM), etc. The storage device 502, is a read-and-write memory device. In some aspects, this device can be a non-volatile memory unit that stores instructions and data even when the processor-based system 500 is without power. Some implementations of the subject disclosure can use a mass-storage device (such as solid state, magnetic or optical storage devices) e.g., a permanent storage device 502.

Other implementations can use one or more a removable storage devices (e.g., magnetic or solid state drives) such as permanent storage device 502. Although the system memory can be either volatile or non-volatile, in some examples the system memory 504 is a volatile read-and-write memory, such as a random access memory. System memory 504 can store some of the instructions and data that the processor needs at runtime.

In some implementations, the processes of the subject disclosure are stored in system memory 504, permanent storage device 502, ROM 510 and/or one or more memory locations embedded with the processor(s) 512. From these various memory units, processor(s) 512 retrieve instructions to execute and data to process in order to execute the processes of some implementations of the instant disclosure.

The bus 508 also connects to the input device interface 514 and output device interface 506. The input device interface 514 enables a user to communicate information and select commands to the processor-based system 500. Input devices used with the input device interface 514 may include for example, alphanumeric keyboards and pointing devices (also called "cursor control devices") and/or wireless devices such as wireless keyboards, wireless pointing devices, etc.

Finally, as shown in FIG. 5, bus 508 also communicatively couples the processor-based system 500 to a network (not shown) through a network interface 516. It should be understood that the network interface 516 can be either wired, optical or wireless and may comprise one or more antennas and transceivers. In this manner, the processor-based system 500 can be a part of a network of computers, such as a local area network ("LAN"), a wide area network ("WAN"), or a network of networks, such as the Internet (e.g., the network 410, as discussed above).

In practice the methods of the subject invention can be carried out by the processor-based system 500. In some aspects, instructions for performing one or more of the method steps of the present disclosure will be stored on one or more memory devices such as the storage 502 and/or the system memory 504.

In this specification, the term "software" is meant to include firmware residing in read-only memory or applications stored in magnetic storage, which can be read into memory for processing by a processor. Also, in some implementations, multiple software aspects of the subject disclosure can be implemented as sub-parts of a larger program while remaining distinct software aspects of the subject disclosure. In some implementations, multiple software aspects can also be implemented as separate programs. Finally, any combination of separate programs that together implement a software aspect described here is within the scope of the subject disclosure. In some implementations, the software programs, when installed to operate on one or more electronic systems, define one or more specific machine implementations that execute and perform the operations of the software programs.

A computer program (also known as a program, software, software application, script, or code) can be written in any form of programming language, including compiled or interpreted languages, declarative or procedural languages, and it can be deployed in any form, including as a stand alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

As used in this specification and any claims of this application, the terms "computer", "server", "processor", and "memory" all refer to electronic or other technological devices. These terms exclude people or groups of people. For the purposes of the specification, the terms display or displaying means displaying on an electronic device. As used in this specification and any claims of this application, the terms "computer readable medium" and "computer readable media" are entirely restricted to tangible, physical objects that store information in a form that is readable by a computer. These terms exclude any wireless signals, wired download signals, and any other ephemeral signals.

Embodiments of the subject matter described in this specification can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the subject matter described in this specification, or any combination of one or more such back end, middleware, or front end components. The components of the system can be interconnected by any form or medium of digital data communication, e.g., a communication network. Examples of communication networks include a local area network ("LAN") and a wide area network ("WAN"), an internetwork (e.g., the Internet), and peer-to-peer networks (e.g., ad hoc peer-to-peer networks).

The computing system can include clients and servers. A client and server are generally remote from each other and typically interact through a communication network. The relationship of client and server arises by virtue of computer programs running on the respective computers and having a client-server relationship to each other. In some embodiments, a server transmits data (e.g., an HTML page) to a client device (e.g., for purposes of displaying data to and receiving user input from a user interacting with the client device). Data generated at the client device (e.g., a result of the user interaction) can be received from the client device at the server.

It is understood that any specific order or hierarchy of steps in the processes disclosed is an illustration of example approaches. Based upon design preferences, it is understood that the specific order or hierarchy of steps in the processes may be rearranged, or that all illustrated steps be performed. Some of the steps may be performed simultaneously. For example, in certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but are to be accorded the full scope consistent with the language claims, wherein reference to an element in the singular is not intended to mean "one and only one" unless specifically so stated, but rather "one or more." Unless specifically stated otherwise, the term "some" refers to one or more. Pronouns in the masculine (e.g., his) include the feminine and neuter gender (e.g., her and its) and vice versa. Headings and subheadings, if any, are used for convenience only and do not limit the subject disclosure.

It is understood that the specific order or hierarchy of steps disclosed herein is exemplify some implementations of the subject technology. However, depending on design preference, it is understood that the specific order or hierarchy of steps in the processes can be rearranged. For example, some of the steps may be performed simultaneously. As such, the accompanying method claims present elements of the various steps in a sample order, and are not meant to be limited to the specific order or hierarchy presented.

A phrase such as an "aspect" does not imply that such aspect is essential to the subject technology or that such aspect applies to all configurations of the subject technology. A disclosure relating to an aspect may apply to all configurations, or one or more configurations. A phrase such as an aspect may refer to one or more aspects and vice versa. A phrase such as a "configuration" does not imply that such configuration is essential to the subject technology or that such configuration applies to all configurations of the subject technology. A disclosure relating to a configuration may apply to all configurations, or one or more configurations. A phrase such as a configuration may refer to one or more configurations and vice versa.

What is claimed is:

1. A machine-implemented method comprising:
receiving, by one or more computing devices via an electronic network, an indication that a first user has interacted with a second user in an online social network;
calculating, by the one or more computing devices in response to receiving the indication, a social affinity score between the first user and the second user based on first user information, second user information, or relationship information between the first user and the second user;

selecting, by the one or more computing devices for a computer-implemented notification related to the indication that the first user interacted with the second user, one of a plurality of predetermined delivery actions based on the social affinity score, the plurality of predetermined delivery actions comprising immediately delivering the notification for display to the second user and delivering the notification for display to the second user after a predetermined time period has elapsed together with one or more other notifications delivered after the predetermined time period; and delivering, by the one or more computing devices via the electronic network, the notification according to the selected one of the plurality of predetermined delivery actions for the notification.

2. The method of claim 1, wherein the notification comprises an indication that the first user has added the second user to one or more social networking circles or groups.

3. The method of claim 1, wherein the first user information comprises a number of times that the first user has been ignored or blocked by users of the social network.

4. The method of claim 1, wherein the first user information further comprises one or more of an indication as to how many posts made by the first user have been blocked or flagged by users of the social network, or an indication as to how frequently the first user notifies one or more users of the social network regarding content posted by the first user.

5. The method of claim 1, wherein the second user information comprises a number of times that the second user has posted publicly available content within the social network.

6. The method of claim 1, wherein the second user information comprises a frequency with which the second user logs into the social network.

7. The method of claim 1, wherein the relationship information comprises an indication as to whether or not the first user has ever commented on a post made by the second user.

8. The method of claim 1, wherein the relationship information comprises an indication as to whether or not the second user has ever commented on a post made by the first user.

9. The method of claim 1, wherein the relationship information further comprises one or more of an indication as to how many users, in one or more social networking circles or groups of the second user, have commented on posts by the first user, or whether the first user and the second user share similar demographic information.

10. The method of claim 1, wherein scheduling delivery of the notification to the second user, further comprises:
ranking the notification relative to one or more other notifications based on the social affinity score.

11. The method of claim 1, wherein the plurality of predetermined delivery actions for the notification further comprise blocking the notification from being displayed to the second user.

12. The method of claim 1, wherein delivering the notification for display to the second user after a predetermined time period has elapsed comprises bundling the notification and other notifications that have not been provided to the second user in to a batch of notifications, and delivering the batch of notifications to the user after the predetermined time period has elapsed.

13. A system for delivering a notification via an electronic network, the system comprising:

one or more processors; and a non-transitory machine-readable medium comprising instructions stored therein, which when executed by the processors, cause the processors to perform operations comprising:

receiving, via the electronic network, an indication that a first user has interacted with a second user in an online social network;

calculating, by one or more computing devices in response to receiving the indication, a social affinity score between the first user and the second user based on first user information, second user information, or relationship information between the first user and the second user;

selecting, for a computer-implemented notification related to the indication that the first user interacted with the second user, one of a plurality of predetermined delivery actions based on the social affinity score, the plurality of predetermined delivery actions comprising immediately delivering the notification for display to the second user and delivering the notification for display to the second user after a predetermined time period has elapsed together with one or more other notifications delivered after the predetermined time period; and delivering, via the electronic network, the notification according to the selected one of the plurality of predetermined delivery actions, wherein the notification comprises an indication that the first user has added the second user to one or more social networking circles or groups.

14. The system of claim 13, wherein the first user information comprises a number of times that the first user has been ignored or blocked by users of the social network.

15. The system of claim 13, wherein the first user information further comprises one or more of an indication as to how many posts made by the first have been blocked or flagged by users of the social network, or an indication as to how frequently the first user notifies one or more users of the social network regarding content posted by the first user.

16. The system of claim 13, wherein the second user information comprises a number of times that the second user has posted publicly available content within the social network.

17. The system of claim 13, wherein the second user information comprises a frequency with which the second user logs into the social network.

18. The system of claim 13, wherein the relationship information comprises an indication as to whether or not the first user has ever commented on a post made by the second user.

19. The system of claim 13, wherein the relationship information comprises an indication as to whether or not the second user has ever commented on a post made by the first user.

20. The system of claim 13, wherein the relationship information further comprises one or more of an indication as to how many users, in one or more social networking circles or groups of the second user, have commented on posts by the first user, or whether the first user and the second user share similar demographic information.

21. The system of claim 13, wherein the plurality of predetermined delivery actions for the notification further comprise blocking the notification from being displayed to the second user.

22. The system of claim 13, wherein delivering the notification for display to the second user after a predetermined time period has elapsed comprises bundling the notification and other notifications that have not been provided to the second user in to a batch of notifications, and delivering the batch of notifications to the user after the predetermined time period has elapsed.

23. A non-transitory machine-readable medium comprising instructions stored therein, which when executed by a machine, cause the machine to perform operations comprising:

receiving, via an electronic network, an indication that a first user has interacted with a second user in an online social network;

calculating, by one or more computing devices in response to receiving the indication, a social affinity score between the first user and the second user based on first user information, second user information, or relationship information between the first user and the second user;

selecting, for a computer-implemented notification related to the indication that the first user interacted with the second user, one of a plurality of predetermined delivery actions for the generated notification based on the social affinity score, the plurality of predetermined delivery actions comprising immediately delivering the notification for display to the second user and delivering the notification for display to the second user after a predetermined time period has elapsed together with one or more other notifications delivered after the predetermined time period; and delivering, via the electronic network, the notification according to the selected one of the plurality of predetermined delivery actions.

24. The non-transitory machine-readable medium of claim 23, wherein the plurality of predetermined delivery actions for the notification further comprise blocking the notification from being displayed to the second user.

25. The non-transitory machine-readable medium of claim 23, wherein delivering the notification for display to the second user after a predetermined time period has elapsed comprises bundling the notification and other notifications that have not been provided to the second user in to a batch of notifications, and delivering the batch of notifications to the user after the predetermined time period has elapsed.

* * * * *